US012217297B2

United States Patent
Kumar et al.

(10) Patent No.: US 12,217,297 B2
(45) Date of Patent: Feb. 4, 2025

(54) HYPER-SEGMENTED PERSONALIZATION USING MACHINE LEARNING-BASED MODELS IN AN INFORMATION PROCESSING SYSTEM

(71) Applicant: Dell Products L.P., Round Rock, TX (US)

(72) Inventors: Dhilip S. Kumar, Bangalore (IN); Sujit Kumar Sahoo, Bangalore (IN); Ajay Maikhuri, Bangalore (IN); Devaraj Marappa, Krishnagiri District (IN)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 17/746,034

(22) Filed: May 17, 2022

(65) Prior Publication Data
US 2023/0377019 A1   Nov. 23, 2023

(51) Int. Cl.
| | |
|---|---|
| *G06Q 30/06* | (2023.01) |
| *G06N 7/01* | (2023.01) |
| *G06N 20/20* | (2019.01) |
| *G06Q 30/0601* | (2023.01) |

(52) U.S. Cl.
CPC ......... *G06Q 30/0631* (2013.01); *G06N 7/01* (2023.01); *G06N 20/20* (2019.01)

(58) Field of Classification Search
None
See application file for complete search history.

(56) References Cited

U.S. PATENT DOCUMENTS

| 9,734,503 | B1 * | 8/2017 | Gargi | G06Q 30/0631 |
|---|---|---|---|---|
| 11,270,243 | B1 * | 3/2022 | Roy | B60L 53/67 |
| 11,657,268 | B1 * | 5/2023 | Refaat | G06N 3/008 |
| | | | | 706/18 |
| 11,843,549 | B1 * | 12/2023 | Maikhuri | H04L 41/16 |
| 11,843,651 | B2 * | 12/2023 | Mo | G06Q 30/0251 |

(Continued)

OTHER PUBLICATIONS

Anon., "Savage Beast Technologies Unleashes New Music Search and Recommendation Technology That Maps Genetic Makeup of Music to an Individual's Taste," PR Newswire [New York], Nov. 13, 2000. (Year: 2000).*

(Continued)

*Primary Examiner* — Nicholas D Rosen
(74) *Attorney, Agent, or Firm* — Ryan, Mason & Lewis, LLP

(57) ABSTRACT

Techniques are disclosed for hyper-segmented personalization using machine learning-based models in an information processing system. For example, a method obtains one or more product experience recommendation data sets respectively from one or more product entities, and one or more purchase experience recommendation data sets respectively from one or more commerce entities. The method applies a federated ensemble-based machine learning algorithm to at least one of the one or more purchase experience recommendation data sets and at least one of the one or more product experience recommendation data sets to generate a personalized model, and causes adaptation of a purchasing interface of at least one of the one or more commerce entities with respect to a given user based on the personalized model.

20 Claims, 6 Drawing Sheets

(56) References Cited

U.S. PATENT DOCUMENTS

| | | | | |
|---|---|---|---|---|
| 2012/0191719 A1* | 7/2012 | Musgrove | ......... | G06Q 30/0605 |
| | | | | 707/740 |
| 2012/0316985 A1* | 12/2012 | Wilkinson | ............ | G01B 21/20 |
| | | | | 705/26.7 |
| 2017/0293610 A1* | 10/2017 | Tran | ..................... | G06Q 10/109 |
| 2019/0163185 A1* | 5/2019 | Bin-Nun | .............. | B60W 40/09 |
| 2020/0372032 A1* | 11/2020 | Roan | ..................... | G06F 16/248 |
| 2021/0097381 A1* | 4/2021 | Daykin | .............. | G06F 11/3495 |
| 2021/0141940 A1* | 5/2021 | Naqvi | .................. | G06F 21/602 |
| 2021/0295979 A1* | 9/2021 | Abraham | ............... | G16B 40/00 |
| 2022/0019849 A1* | 1/2022 | Kim | ........................ | G06N 3/08 |
| 2022/0121999 A1* | 4/2022 | Wang | ....................... | G06N 5/04 |
| 2022/0150292 A1* | 5/2022 | Mo | ................... | G06Q 30/0631 |
| 2023/0041339 A1* | 2/2023 | Ni | ...................... | G06Q 30/0202 |
| 2023/0245205 A1* | 8/2023 | Kollipara | .......... | G06Q 30/0631 |
| | | | | 705/26.7 |
| 2024/0054384 A1* | 2/2024 | Catron | .................. | G06N 3/063 |

OTHER PUBLICATIONS

Anon., "Amplitude Unveils the Industry's First Digital Optimization System," PR Newswire Asia [New York] Apr. 2, 2601. (Year: 2021).*

Ickin, S., et al., "QoE Modeling on Split Features with Distributed Deep Learning," Network 1.2: 165. MDPI AG. (Year: 2021).*

Wikipedia, "Federated Learning," https://en.wikipedia.org/wiki/Federated_learning, May 5, 2022, 14 pages.

T. Lin et al., "Ensemble Distillation for Robust Model Fusion in Federated Learning," Proceedings of the 34th International Conference on Neural Information Processing Systems, Dec. 2020, 13 pages.

\* cited by examiner

HYPER-SEGMENTED PERSONALIZATION USING MACHINE LEARNING-BASED MODELS IN AN INFORMATION PROCESSING SYSTEM

FIELD

The field relates generally to information processing systems, and more particularly to machine learning-based processing in such information processing systems.

BACKGROUND

Information processing systems configured as electronic commerce (e-commerce) sites typically offer products for online sale and are deployed/managed by an entity that manufacturers or otherwise produces the products (e.g., an original equipment manufacturer or OEM) and/or one or more third party e-commerce providers (e.g., Amazon, Flipkart, Alibaba, eBay, Zalando, etc.). It has long been realized that the conventional generic customer bucket and mass marketing approach is not effective to enhance the customer experience on such e-commerce sites. Rather, effective market segmentation, or the process of dividing a customer base into different groups based on behaviors on the e-commerce site, is a typical tool of such e-commerce sites. For example, such market segmentation is typically used to personalize the e-commerce experience to attract new customers and retain existing customers.

In fact, studies have shown that a vast majority of customers want a hyper-personal experience in order to maintain their e-commerce site and/or product loyalty. The term hyper-personal refers to a model of interpersonal communication that suggests that computer-mediated communication can become more personal in a shorter period of time as compared with face-to-face interaction.

SUMMARY

Illustrative embodiments provide techniques for hyper-segmented personalization using machine learning-based models in an information processing system. While an e-commerce system environment is one illustrative environment in which such techniques can be particularly effective, it is to be understood that embodiments are not limited thereto.

For example, in an illustrative embodiment, a method comprises the following steps performed by a processing platform comprising at least one processor coupled to at least one memory configured to execute program code. The method comprises obtaining one or more product experience recommendation data sets respectively from one or more product entities, wherein each of the one or more product experience recommendation data sets corresponds to one or more products produced by a respective one of the one or more product entities and is based on a product experience of one or more users with respect to at least one of the one or more products. The method also comprises obtaining one or more purchase experience recommendation data sets respectively from one or more commerce entities, wherein each of the one or more purchase experience recommendation data sets corresponds to the one or more products sold by a respective one of the one or more commerce entities and is based on a purchase experience of the one or more users with respect to at least one of the one or more products. Further, the method comprises applying a federated ensemble-based machine learning algorithm to at least one of the one or more purchase experience recommendation data sets and at least one of the one or more product experience recommendation data sets to generate a personalized model. Still further, the method comprises causing adaptation of a purchasing interface of at least one of the one or more commerce entities with respect to a given one of the one or more users based on the personalized model.

Advantageously, one or more illustrative embodiments provide hyper-segmented personalization that applies ensemble distillation to a federated learning approach to distill a plurality of models (ensemble) into a single model thus capturing the benefits of each model of the ensemble in the single model. For example, one or more purchase experience models and one or more product experience models are distilled into a single hyper-segmented personalization model that can be used to adapt or otherwise modify one or more e-commerce site interfaces with respect to a user.

These and other illustrative embodiments include, without limitation, apparatus, systems, methods and computer program products comprising processor-readable storage media.

DETAILED DESCRIPTION

Figure 1:
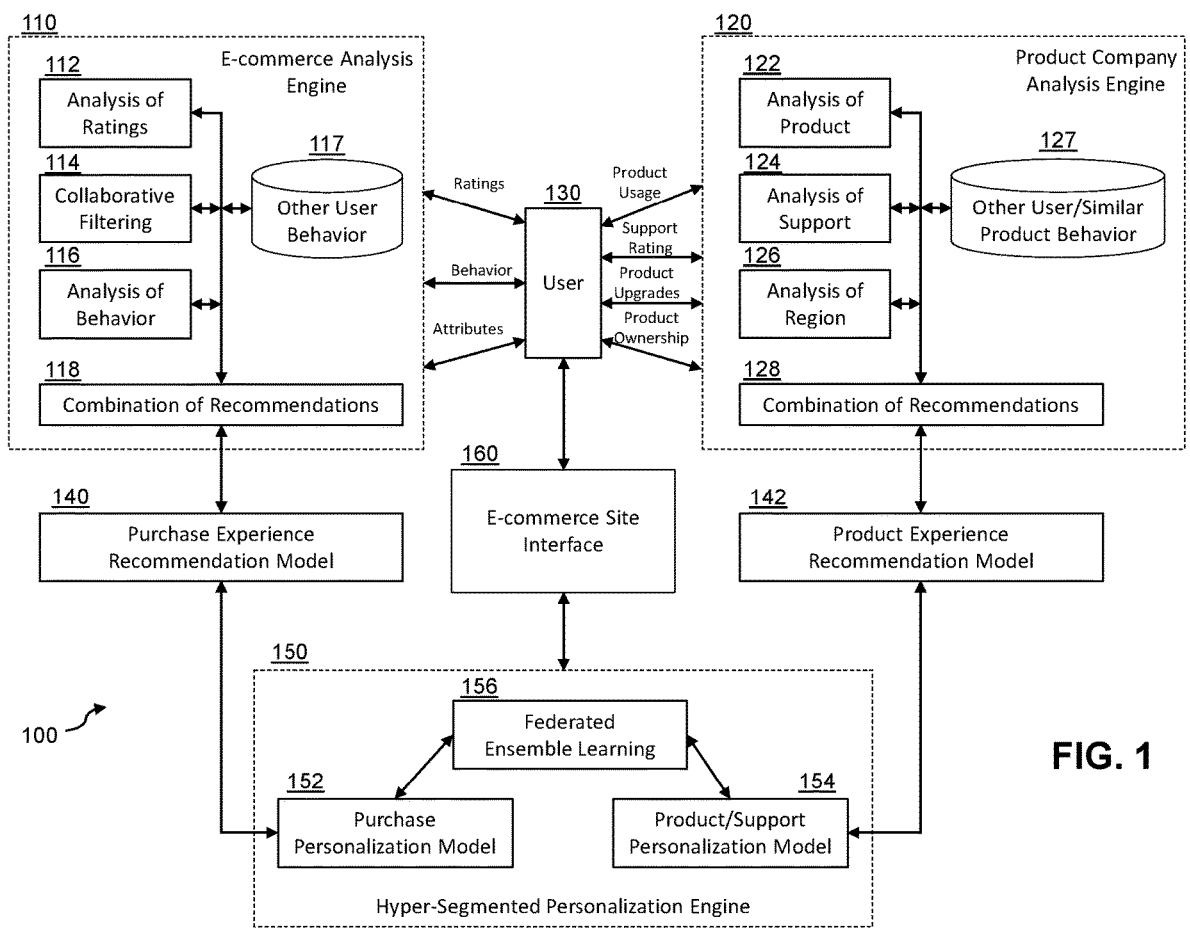
FIG. 1 illustrates an information processing system environment configured with functionalities for hyper-segmented personalization using machine learning-based models according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as illustratively used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as illustratively used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As illustratively used herein, the terms "client," "customer" or "user" are intended to be broadly construed so as to encompass numerous arrangements of human, hardware, software or firmware entities, as well as combinations of such entities.

As illustratively used herein, the term "hyper-segmented personalization" is intended to be broadly construed so as to encompass personalization of an information processing system that computes segmentation based on a hyper-personal basis.

As illustratively used herein, the term "federated learning" refers to a machine learning-based method that enables one or more centralized machine learning models to be trained from different data sets located in different sites (e.g., multiple local data centers or other sources) without sharing training data.

It is realized herein that existing e-commerce personalization approaches tend to be centric and monolithic in nature, i.e., based on a customer purchase experience in an e-commerce site. Furthermore, it is further realized herein that existing e-commerce personalization approaches do not account for the perspective of product companies, who would prefer that their products be displayed in ways that are consistent and that facilitate, inter alia, selling, promoting, and/or discounting their products.

Illustrative embodiments overcome the above and other technical problems with existing e-commerce personalization approaches by providing hyper-segmented personalization that applies ensemble distillation to a federated learning approach to distill a plurality (ensemble) of models into a single model thus capturing the benefits of each model of the ensemble in the single model. For example, one or more purchase experience models (i.e., purchase experience recommendation data sets) and one or more product experience models (i.e., product experience recommendation data sets) are distilled into a single hyper-segmented personalization model (i.e., personalized model) that can be used to cause adaption or otherwise modification of one or more e-commerce site interfaces with respect to a user. Such adaptations/modifications may comprise, but are not limited to, causing display of one or more recommended products within the interface (e.g., a graphical user interface or GUI of the e-commerce site) based on the hyper-segmented personalization model. In illustrative embodiments, at least some of the models are machine learning-based models as will be further explained in detail herein.

FIG. 1 illustrates an information processing system environment 100 configured with hyper-segmented personalization functionalities using machine learning-based models according to an illustrative embodiment. As generally shown, information processing system environment 100 comprises an e-commerce analysis engine 110 and a product company analysis engine 120 that respectively process data collected from or otherwise provided for a user 130. Note that in one or more illustrative embodiments, e-commerce analysis engine 110 is maintained by a commerce entity (e.g., an OEM or a third party e-commerce provider), while product company analysis engine 120 is maintained by a product entity (e.g., the OEM).

Figure 2:
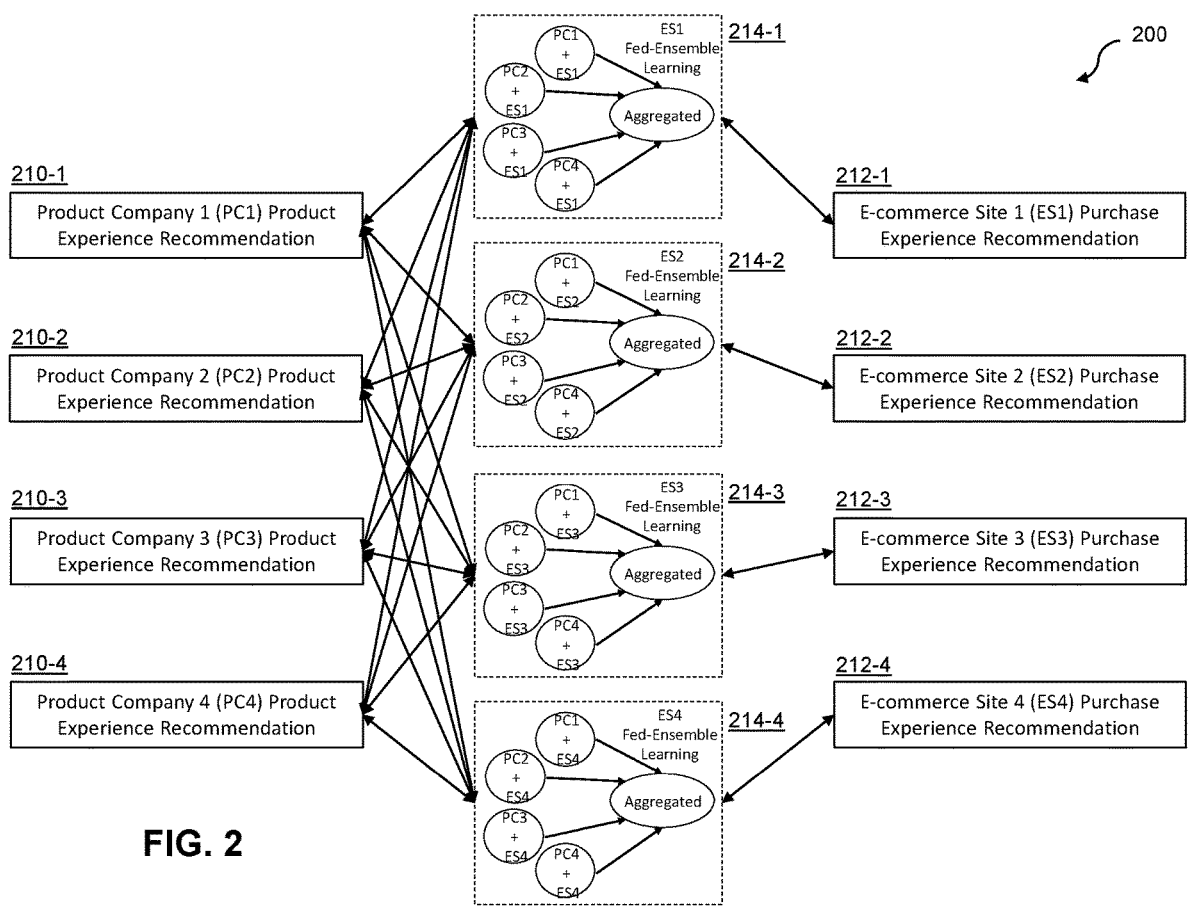
FIG. 2 illustrates at least a portion of an information processing system configured for implementing hyper-segmented personalization functionalities using machine learning-based models according to an illustrative embodiment.
Figure 3A:
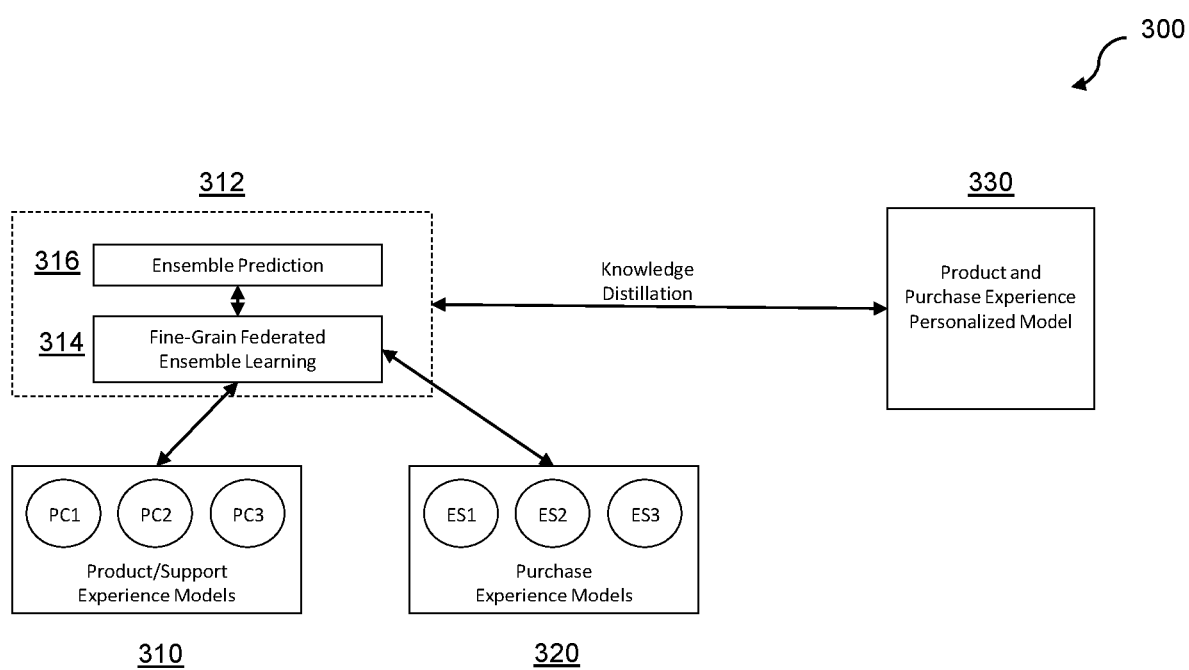
FIG. 3A illustrates federated ensemble knowledge distillation functionalities according to an illustrative embodiment.
Figure 3B:
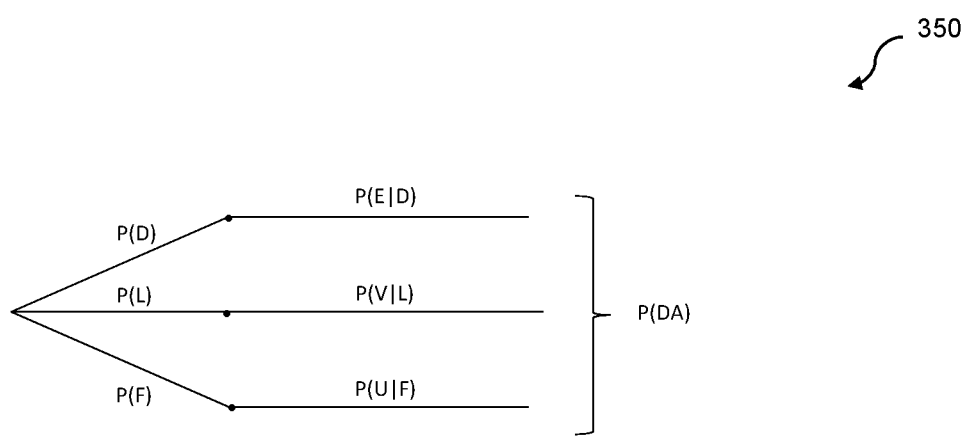
FIG. 3B illustrates a statistical methodology for implementing federated ensemble knowledge distillation functionalities according to an illustrative embodiment.

Furthermore, as shown, e-commerce analysis engine 110 generates a purchase experience recommendation model 140, while product company analysis engine 120 generates a product experience recommendation model 142. Purchase experience recommendation model 140 and product experience recommendation model 142 are data sets input to a hyper-segmented personalization engine 150 which modifies an e-commerce site interface 160 with which user 130 interacts. Note that FIG. 1 illustrates one product company and one e-commerce site for one user (e.g., customer). However, as will be further illustratively explained below in the context of FIGS. 2, 3A and 3B, illustrative embodiments are configurable to implement hyper-segmented personalization functionalities across multiple e-commerce sites and multiple product companies for multiple users.

Accordingly, e-commerce analysis engine 110 receives ratings data, behavior data, and attribute data from user 130 and performs an analysis of ratings 112, a collaborative filtering 114, an analysis of behavior 116, and takes into account other user behavior 117 to generate a combination of recommendations 118. By way of example, ratings data can comprise data indicative of ratings or other feedback from user 130 with respect to user interaction with the e-commerce site. Behavior data and attributes data, by way of example, can comprise data indicative of the user's actions taken and inputs provided during interactions with the e-commerce site. Collaborative filtering 114 uses data for user 130 and other user data (other user behavior 117) to intelligently (i.e., utilizing machine learning technique(s)) identify relationships between data from multiple users, i.e., identify similarities between user data to make one or more recommendations. Combination of recommendations 118 is used to generate purchase experience recommendation model 140.

Further, product company analysis engine 120 receives product usage data, support rating data, product upgrade data, and product ownership data from user 130 and performs an analysis of product 122, an analysis of support 124, an analysis of region 126, and takes into account other user/similar product behavior 127 to generate a combination of recommendations 128. For example, product usage data can comprise data indicative of usage experiences that user 130 had or is having, post-purchase, with respect to a given product. Also, by way of example, support rating data can comprise data indicative of ratings or other feedback from user 130 with respect to product support provided to user 130 from the product company with regard to a given product. Product upgrade data and product ownership data can comprise, for example, data describing the current upgrade state and ownership of a given product. Note that region analysis depends on whether or not the product company, e.g., an OEM of computing equipment, operates in multiple regions, e.g., geographic regions; in which case, recommendations may then depend on a geographic region. Combination of recommendations 128 is used to generate product experience recommendation model 142.

Purchase experience recommendation model 140 is used to generate a purchase personalization model 152 in hyper-segmented personalization engine 150, while product experience recommendation model 142 is used to generate a product/support personalization model 154 (referred to herein, on occasion, more simply as a product personalization model) in hyper-segmented personalization engine 150. Purchase personalization model 152 and product/support personalization model 154 are used by a federated ensemble learning engine 156 to determine the specific hyper-segmented adaptations to be implemented on e-commerce site interface 160 for user 130.

Thus, in illustrative embodiments, as will be further explained below in detail, a combination of purchase-based personalization and product-based personalization are utilized to provide hyper-segmented personalization by applying ensemble distillation in a federated learning engine to distill a plurality (ensemble) of models into a single model thus capturing the benefits of each model of the ensemble in a single model.

Thus, it is to be appreciated that information processing system environment 100 analyzes interactions of a user (a customer of one or more e-commerce sites) and creates a multichannel setup for a seamless online and offline shopping experience. Thus, among other technical features and advantages, when the customer switches from one e-commerce site to another, a particular product company's product can be displayed consistently. For example, a product of a given company is displayed on each e-commerce site in a consistent manner based on the customer's preferences.

Illustrative embodiments prioritize/recommend products to the customer by learning both customer purchase experience and product/support experience. Prioritization/recommendation is achieved via an interface such as one or more graphical user interfaces or GUIs that enable online access, browsing, and/or purchasing of products associated with each e-commerce site. For example, illustrative embodiments enable product companies' customer behavior analysis post selling to influence the personalization of the products in multiple e-commerce sites. Thus, by way of example only, an OEM of computing equipment such as Dell Technologies can have its products personalized consistently across e-commerce sites such as, but not limited to, Amazon, Flipkart, Alibaba, eBay, Zalando, etc., as well as on their own e-commerce site, for all or portions of its existing customers and/or potential customers.

Hyper-segmented personalization engine 150 enables e-commerce and product company functionality integration by providing for a product/support experience in the context of an e-commerce site. More particularly, as will be further illustrated below in the context of FIGS. 2, 3A and 3B, federated ensemble (fed-ensemble) techniques apply a robust model fusion of the product company's personalization model (e.g., 154 in FIG. 1) with the e-commerce personalization model (e.g., 152 in FIG. 1).

Before explaining details of technical solutions according to one or more illustrative embodiments, illustrative techniques used to enable personalization from various models will be explained.

First, an ensemble is a technical concept of combining a diverse set of learners (individual models) to improvise on the stability and predictive power of the model. Federated learning, as illustratively used herein, is a distributed method for collaborative training of a learning model without the need for training the data, and aims to collaboratively train a robust global model by accessing users' locally trained models but not their data. Thus, the ensemble distillation employed according to one or more illustrative embodiments not only addresses the quality loss issue of batch normalization in a homogeneous federated learning system, but also overcomes knowledge barriers among heterogeneous client models. In the case of a new product launch, illustrative embodiments enable a constant recommendation from the product company and customer-based recommendations from the e-commerce site(s).

FIGS. 2, 3A and 3B depict an illustrative architecture for implementing hyper-segmented personalization according to one or more illustrative embodiments. The illustrative architecture can be implemented, for example, in hyper-segmented personalization engine 150 of FIG. 1. As explained above, illustrative embodiments of hyper-segmented personalization engine 150 implement hyper-segmented personalization functionalities across multiple e-commerce sites (ESs) and multiple product companies (PCs) for multiple users. Accordingly, respective product companies build a recommendation data set based on each customer and their product, i.e., product/support experience, while respective e-commerce sites build a recommendation data set based on customer interaction, i.e., purchase experience. Each of the product and e-commerce recommendations are aggregated using federated ensemble (fed-ensemble) technique, as will be further explained herein.

Referring now to FIG. 2, an architecture 200 is shown for implementing hyper-segmented personalization functionalities using machine learning-based models according to an illustrative embodiment. Again, it is to be appreciated that architecture 200 can be implemented in hyper-segmented personalization engine 150 of FIG. 1 in one or more illustrative embodiments.

As shown in FIG. 2, multiple product companies: PC1, PC2, PC3, and PC4, respectively generate product experience recommendations: PC1 product experience recommendation 210-1, PC2 product experience recommendation 210-2, PC3 product experience recommendation 210-3, and PC4 product experience recommendation 210-4. Note that in the FIG. 1 embodiment, these product experience recommendations (collectively referred to as PC product experience recommendations 210 or individually as PC product experience recommendation 210) correspond to product experience recommendation model 142 which, for each of PC1, PC2, PC3 and PC4, is generated by product company analysis engine 120.

As further shown in FIG. 2, multiple e-commerce sites: ES1, ES2, ES3, and ES4, respectively generate purchase experience recommendations: ES1 purchase experience recommendation 212-1, ES2 purchase experience recommendation 212-2, ES3 purchase experience recommendation 212-3, and ES4 purchase experience recommendation 212-4. Note that in the FIG. 1 embodiment, these purchase experience recommendations (collectively referred to as ES purchase experience recommendations 212 or individually as ES purchase experience recommendation 212) correspond to purchase experience recommendation model 140 which, for each of ES1, ES2, ES3 and ES4, is generated by e-commerce analysis engine 110.

Then, as further shown in FIG. 2, for each of ES1, ES2, ES3, and ES4, combinations of the ES purchase experience recommendation 212 and each PC product experience recommendation 210 are aggregated using federated ensemble (fed-ensemble) techniques. That is, for ES1, ES1 purchase experience recommendation 212-1 is combined with each of PC1 product experience recommendation 210-1, PC2 product experience recommendation 210-2, PC3 product experience recommendation 210-3, and PC4 product experience recommendation 210-4 in fed-ensemble learning module 214-1. For ES2, ES2 purchase experience recommendation 212-2 is combined with each of PC1 product experience recommendation 210-1, PC2 product experience recommendation 210-2, PC3 product experience recommendation 210-3, and PC4 product experience recommendation 210-4 in fed-ensemble learning module 214-2. For ES3, ES3 purchase experience recommendation 212-3 is combined with each of PC1 product experience recommendation 210-1, PC2 product experience recommendation 210-2, PC3 product experience recommendation 210-3, and PC4 product experience recommendation 210-4 in fed-ensemble learning module 214-3. For ES4, ES4 purchase experience recommendation 212-4 is combined with each of PC1 product experience recommendation 210-1, PC2 product experience recommendation 210-2, PC3 product experience recommendation 210-3, and PC4 product experience recommendation 210-4 in fed-ensemble learning module 214-4.

Accordingly, for each of ES1, ES2, ES3, and ES4, a single hyper-segmented personalization model is generated by federated ensemble knowledge distillation and used to adapt or otherwise modify its e-commerce site interface with respect to a given user (e.g., prioritize/recommend products and/or other features to the given user in the e-commerce interface). Advantageously, each of a plurality of users can therefore experience a unique hyper-segmented personalization (based on a combination of purchase experience and product experience of that user) of the e-commerce site being visited, while a product company can ensure that its products are presented as they so desire for each user. Note that the number of e-commerce sites and/or product companies that can be involved in such hyper-segmented personalization as depicted in FIG. 2 is intended as an example, i.e., greater and/or fewer numbers of e-commerce sites and/or product companies may be involved in alternative embodiments.

FIG. 3A further illustrates a federated ensemble knowledge distillation concept 300 used in architecture 200 of FIG. 2. Federated ensemble knowledge distillation concept 300 provides, inter alia, data security, cross model training, and/or building of a model with available knowledge. As depicted, product/support experience models 310 from available product companies, i.e., in this example, PC1, PC2, and PC3, are provided to a federated ensemble learning engine 312. In federated ensemble learning engine 312, fine-grain federated ensemble learning module 314 aggregates product/support experience models 310 and prediction is applied in ensemble prediction module 316. The prediction is enabled, for example, because one or more of the product/support models (e.g., from PC4) may not be available due to network or other outages. Thus, the non-available model output is predicted to obtain a smoother operation. Knowledge distillation trains a product and purchase personalized model 330 (also referred to as personalized model 330 which provides the final recommendation) with a ground truth label, along with one or more purchase experience models 320. Accordingly, personalized model 330 is trained from both purchase experience and product/support experience.

Federated learning as applied in illustrative embodiments will now be further explained. Federated learning typically involves a server coordinating with multiple clients (sources of models, in this case, e-commerce sites and product companies) to learn a global model without joint data sharing. In practice, the server should have little control and knowledge about the clients. Each client may have different data distributions in the input (e.g., image distribution) or output (e.g., label distribution). Some clients may disconnect at certain rounds. These factors suggest the non-i.i.d. (independent and identically distributed) nature of federated learning in practice, under which federated averaging (FEDAVG) may be effected. FEDAVG is a communication-efficient machine learning algorithm for distributed training with a large number of clients. In FEDAVG, clients keep their data locally for privacy protection and a central parameter server is used to communicate between clients.

In the context of illustrative embodiments, federated learning is useful because a product company continues to secure their data and share only the learning through models. Also, even if one of the product companies fails to share the model, the recommendation still continues. For example, as shown in FIG. 3A, if PC4 fails to share its learning (e.g., fails to share its product experience recommendation model 142 in FIG. 1), hyper-segmented personalization continues based the other available product companies' (PC1, PC2, and PC3) learning and recommendations.

Thus, hyper-segmented personalization according to illustrative embodiments computes FEDAVG as follows. Denote the set of clients:

$$D_i = \{(x_n, y_n)\}_{n=1}^{N_i}$$

wherein for the labeled data of client i, and $\overline{w}$ the weights of the current global model, FEDAVG starts with client training of all the clients in parallel, initializing each client's model $w_i$ with $\overline{w}$ and performing Stochastic Gradient Descent (SGD) for K steps with a step size $n_i$.

Client Training:

$$w_i \leftarrow w_i - n_i \nabla l(B_K, w_i) \text{ for } k=1,2,3 \ldots k, \qquad (1)$$

where l is a loss function and $B_K$ is the mini-batch sampled from $D_i$ at the $K^{th}$ step. After receiving all the client's models $\{w_i; i \in S\}$, given $|D|=|D_i|$ FEDAVG performs weight average to update the global model $\overline{w}$ Model aggregation (by weight-average):

$$\overline{w} \leftarrow \sum_i \frac{|D_i|}{|D|} w_i \qquad (2)$$

With the updated global model $w_i$, FEDAVG then starts the next round of client training. Therefore, the entire procedure of FEDAVG iterates between Equation 1 and Equation 2 for R rounds.

In the case that $D_i$ is i.i.d. sampled from the aggregated data $D = U_{i \in s} D_i$, FEDAVG has been shown convergent to the ideal model w* learned directly from D in a centralized manner.

It is realized that the model's average may not always be the most suitable probability for the recommendation, hence, Bayesian statistics may be used in illustrative embodiments. In Bayesian statistics, the posterior probability of a random event or an uncertain proposition is the conditional probability given the relevant evidence or background. Posterior, in this context, means after considering the pertinent evidence related to the particular case being examined.

It is realized herein that an evidence-based model may be most suitable. Many shreds of evidence can influence the e-commerce model.

In Bayesian learning, it is the posterior distribution p(w|D) of the global model being learned, from which $\overline{w}$ and w* can be regarded as two particular samples (i.e., point estimates). Denote by P(y|x; w) the output probability of a global model w, one approach to mitigate model drift is to perform Bayesian inference for prediction, integrating the outputs of all possible models with respect to the posterior:

$$p(y|x;D) = \int p(y|x;w)p(w|D)dw \quad (3)$$

rather than relying on a single-point estimate. While Equation 3 may be intractable in general, it can be approximated by the Monte Carlo method, sampling M models for model ensemble.

Bayesian Model Ensemble:

$$p(y|x;D) \approx \frac{1}{M}\sum_{m=1}^{M} p(y|x;w^{(m)}), \text{ where } w^{(m)} \sim p(w|D) \quad (4)$$

Bayesian model ensembles with an approximated posterior.

By way of example, as shown in a Bayesian statistical methodology 350 of FIG. 3B, consider the below example with respect to product companies D, L and F and assume the following:

D Probability:
  Probability of selling a laptop manufactured by D equals P(D); and
  Probability of selling a type E laptop from D equals P(E|D).
L Probability:
  Probability of selling a laptop manufactured by L equals P(L); and
  Probability of selling a type V laptop manufactured L equals P(V|L).
F Probability:
  Probability of selling a laptop manufactured by F equals P(F); and
  Probability of selling a type U laptop manufactured F equals P(U|F).

Total Probability of a Laptop Getting Sold from e-Commerce Site A:

$$P(A) = P(D) \cdot P(E|D) + P(L) \cdot P(V|L) + P(F) \cdot P(U|F)$$

Now that the total probability of getting a laptop sold from e-commerce site A is computed, the probability of getting laptops from D sold from e-commerce site A is determined:

$$P(DA) = P(D) \cdot P(E|D)/P(A)$$

From the above formula, if the D probability of selling a D product will increase overall on e-commerce site A, then the probability of selling a D laptop among other laptops will also increase. So the selling of D products can be increased through a federated learning-based recommendation from D to e-commerce site A.

Figure 4:
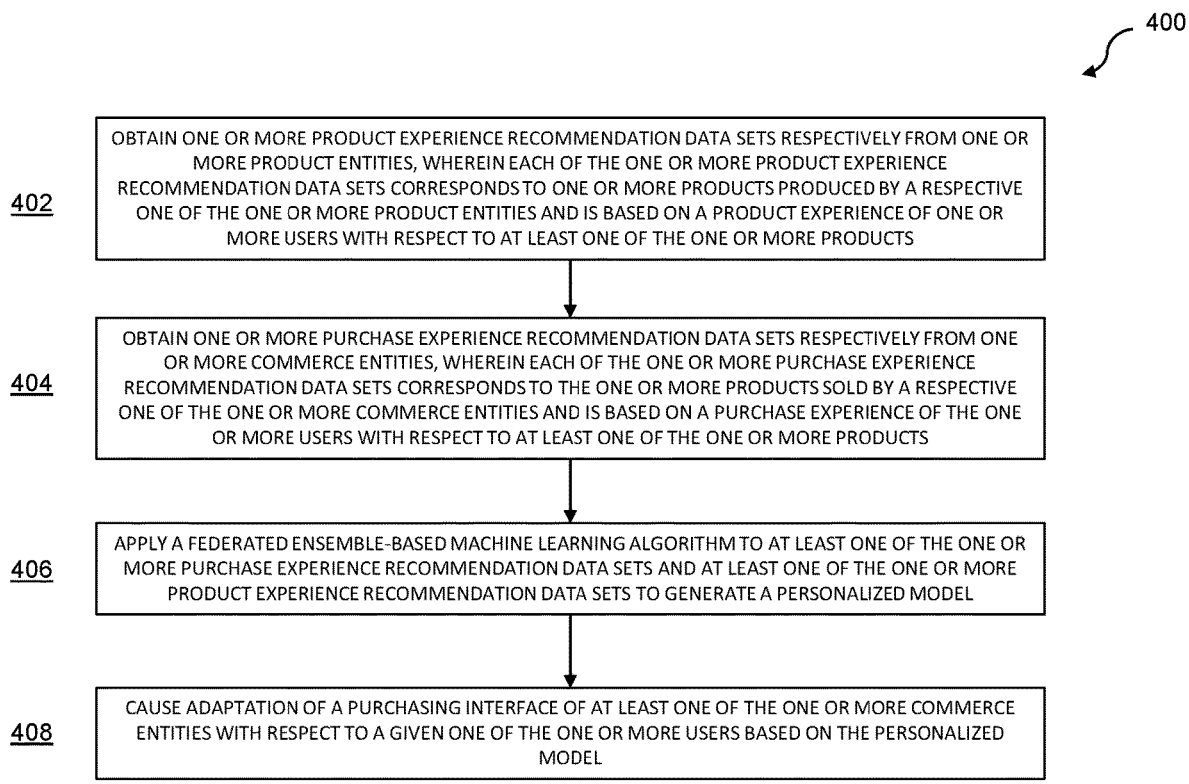
FIG. 4 illustrates a methodology for hyper-segmented personalization using machine learning-based models according to an illustrative embodiment.

FIG. 4 illustrates a methodology 400 for hyper-segmented personalization using machine learning-based models according to an illustrative embodiment. It is to be understood that methodology 400 can be implemented in hyper-segmented personalization engine 150 of FIG. 1 in one or more illustrative embodiments.

As shown, step 402 obtains one or more product experience recommendation data sets respectively from one or more product entities, wherein each of the one or more product experience recommendation data sets corresponds to one or more products produced by a respective one of the one or more product entities and is based on a product experience of one or more users with respect to at least one of the one or more products.

Step 404 obtains one or more purchase experience recommendation data sets respectively from one or more commerce entities, wherein each of the one or more purchase experience recommendation data sets corresponds to the one or more products sold by a respective one of the one or more commerce entities and is based on a purchase experience of the one or more users with respect to at least one of the one or more products.

Step 406 applies a federated ensemble-based machine learning algorithm to at least one of the one or more purchase experience recommendation data sets and at least one of the one or more product experience recommendation data sets to generate a personalized model.

Step 408 causes adaptation of a purchasing interface of at least one of the one or more commerce entities with respect to a given one of the one or more users based on the personalized model.

Advantageously, by way of example only, hyper-segmented personalization in accordance with illustrative embodiments can include, but is not limited to, adapting what products are recommended to a user/customer on an e-commerce site by utilizing fine-grain product/support-based recommendations to improve the accuracy of the recommendations. A federated ensemble knowledge distillation process is provided therein to secure the data across various models (product/brand and e-commerce companies) with an evidence-based probability model to enable each product/brand to add their evidence to the e-commerce model. This influencer is advantageous for today's e-commerce monolithic model. Hence, all e-commerce models can be adapted to recommend similar product or brands. Further, illustrative embodiments prioritize/recommend products to the customer by learning along with customer purchase experience (e-commerce recommendation) and product/support experience (brand/product company recommendation).

Furthermore, in an e-commerce setting, a recommender system enhances revenues because they are effective means of selling more products. With the addition of federated learning with ensemble distillation as implemented in hyper-segmented personalization engine 150 in FIG. 1 and as otherwise explained herein, better recommendations can be made since product companies will have more details about product feedback (e.g., service feedback, customer product usage, component feedback, etc.) tied to the customer profile.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 5:
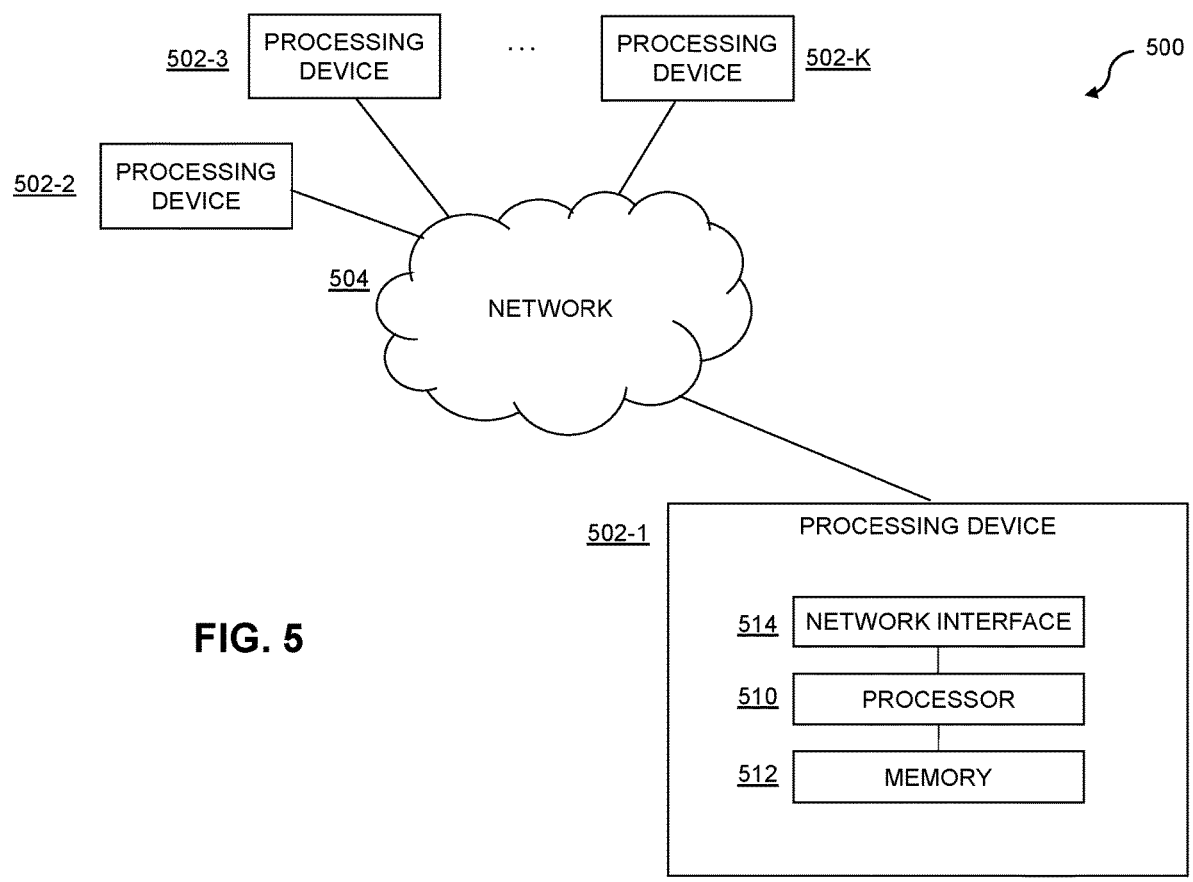
FIG. 5 illustrates an example of a processing platform that may be utilized to implement at least a portion of an information processing system configured with functionalities for hyper-segmented personalization using machine learning-based models according to an illustrative embodiment.

FIG. 5 depicts a processing platform 500 used to implement information processing systems/processes depicted in FIGS. 1 through 4, respectively, according to an illustrative embodiment. More particularly, processing platform 500 is a processing platform on which a computing environment with functionalities described herein can be implemented.

The processing platform 500 in this embodiment comprises a plurality of processing devices, denoted 502-1, 502-2, 502-3, . . . 502-K, which communicate with one another over network(s) 504. It is to be appreciated that the methodologies described herein may be executed in one such processing device 502, or executed in a distributed manner across two or more such processing devices 502. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 502 shown in FIG. 5. The network(s) 504 represent one or more communications networks that enable components to communicate and to transfer data therebetween, as well as to perform other functionalities described herein.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random-access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1 through 4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the networks 504 and other system components. Such circuitry may comprise conventional transceivers of a type well known in the art.

The other processing devices 502 (502-2, 502-3, . . . 502-K) of the processing platform 500 are assumed to be configured in a manner similar to that shown for processing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the system shown as 500 in FIG. 5 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-5 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
a processing platform comprising at least one processor coupled to at least one memory, the processing platform, when executing program code, being configured to:
identify, using one or more machine learning models, one or more similarities between product experience data of a given user and product experience data of one or more users to generate one or more product experience recommendations for the given user;
identify, using the one or more machine learning models, one or more similarities between purchase experience data of the given user and purchase experience data of the one or more users to generate one or more purchase experience recommendations for the given user;
generate a first machine learning model comprising at least one or more product experience recommendation data sets respectively from one or more product entities, wherein each of the one or more product experience recommendation data sets corresponds to one or more products produced by a respective one of the one or more product entities and is based on the one or more product experience recommendations for the given user with respect to at least one of the one or more products;
generate a second machine learning model comprising at least one or more purchase experience recommendation data sets respectively from one or more commerce entities, wherein each of the one or more purchase experience recommendation data sets corresponds to the one or more products sold by a respective one of the one or more commerce entities and is based on the one or more purchase experience recommendations for the given user with respect to at least one of the one or more products;
apply a federated ensemble-based machine learning algorithm to a ground truth label, at least one of the one or more purchase experience recommendation data sets and at least one of the one or more product experience recommendation data sets to generate and train a personalized model, wherein the application of the federated ensemble-based machine learning algorithm comprises:
aggregating the first machine learning model and the second machine learning model into the personalized model by combining each of the one or more product experience recommendation data sets with each of the one or more purchase experience recommendation data sets; and
determining one or more adaptations to be implemented on a purchasing interface of at least one of the one or more commerce entities with respect to a given one of the one or more users based on the personalized model to recommend one or more products to the given one of the one or more users; and
cause the one or more adaptations to be maintained wherein the given one of the one or more users is enabled to switch from the purchasing interface of at least one of the one or more commercial entities to another purchasing interface of at least another of the one or more commercial entities.

2. The apparatus of claim 1, wherein each of the one or more product experience recommendation data sets comprises a machine learning model of the one or more machine learning models.

3. The apparatus of claim 1, wherein each of the one or more product experience recommendation data sets comprises one or more recommendations based on one or more of ratings data and behavior data collected from at least a portion of the one or more users.

4. The apparatus of claim 1, wherein each of the one or more purchase experience recommendation data sets comprises a machine learning model of the one or more machine learning models.

5. The apparatus of claim 1, wherein each of the one or more purchase experience recommendation data sets comprises one or more recommendations based on one or more of product data and support data collected from at least a portion of the one or more users.

6. The apparatus of claim 1, wherein applying a federated ensemble-based machine learning algorithm further comprises:
aggregating the at least one of the one or more purchase experience recommendation data sets and the at least one of the one or more product experience recommendation data sets to form the personalized model to distill knowledge from both the at least one of the one or more purchase experience recommendation data sets and the at least one of the one or more product experience recommendation data sets into the personalized model.

7. The apparatus of claim 6, wherein forming the personalized model further comprises:
predicting recommendation data for one or more unavailable product experience recommendation data sets; and
aggregating the predicted recommendation data with one or more available product experience recommendation data sets.

8. The apparatus of claim 6, wherein forming the personalized model further comprises:
computing probabilities associated with the at least one of the one or more purchase experience recommendation data sets and the at least one of the one or more product experience recommendation data sets to generate the personalized model.

9. The apparatus of claim 8, wherein computing probabilities associated with the at least one of the one or more purchase experience recommendation data sets and the at least one of the one or more product experience recommendation data sets to generate the personalized model further comprises:
applying a Bayesian statistical model to the at least one of the one or more purchase experience recommendation data sets and the at least one of the one or more product experience recommendation data sets.

10. The apparatus of claim 1, wherein causing adaptation of a purchasing interface of at least one of the one or more commerce entities with respect to a given one of the one or more users based on the personalized model further comprises:
causing presentation of one or more recommendations on the purchasing interface that are hyper-personalized for the given user.

11. The apparatus of claim 1, wherein causing adaptation of a purchasing interface of at least one of the one or more commerce entities with respect to a given one of the one or more users based on the personalized model further comprises:
  causing presentation of the one or more products on the purchasing interface consistent with one or more preferences of the corresponding one of the one or more product entities associated with the at least one of the one or more product experience recommendation data sets.

12. A method comprising:
  identifying, using one or more machine learning models, one or more similarities between product experience data of a given user and product experience data of one or more users to generate one or more product experience recommendations for the given user;
  identifying, using the one or more machine learning models, one or more similarities between purchase experience data of the given user and purchase experience data of the one or more users to generate one or more purchase experience recommendations for the given user;
  generating a first machine learning model comprising at least one or more product experience recommendation data sets respectively from one or more product entities, wherein each of the one or more product experience recommendation data sets corresponds to one or more products produced by a respective one of the one or more product entities and is based on the one or more product experience recommendations for the given user with respect to at least one of the one or more products;
  generating a second machine learning model comprising at least one or more purchase experience recommendation data sets respectively from one or more commerce entities, wherein each of the one or more purchase experience recommendation data sets corresponds to the one or more products sold by a respective one of the one or more commerce entities and is based on the one or more purchase experience recommendations for the given user with respect to at least one of the one or more products;
  applying a federated ensemble-based machine learning algorithm to a ground truth label, at least one of the one or more purchase experience recommendation data sets and at least one of the one or more product experience recommendation data sets to generate and train a personalized model, wherein the application of the federated ensemble-based machine learning algorithm comprises:
    aggregating the first machine learning model and the second machine learning model into the personalized model by combining each of the one or more product experience recommendation data sets with each of the one or more purchase experience recommendation data sets; and
    determining one or more adaptations to be implemented on a purchasing interface of at least one of the one or more commerce entities with respect to a given one of the one or more users based on the personalized model to recommend one or more products to the given one of the one or more users; and
  causing the one or more adaptations to be maintained wherein the given one of the one or more users is enabled to switch from the purchasing interface of at least one of the one or more commercial entities to another purchasing interface of at least another of the one or more commercial entities
  wherein the method is performed by a processing platform comprising at least one processor coupled to at least one memory executing program code.

13. The method of claim 12, wherein each of the one or more product experience recommendation data sets comprises a machine learning model of the one or more machine learning models.

14. The method of claim 12, wherein each of the one or more product experience recommendation data sets comprises one or more recommendations based on one or more of ratings data and behavior data collected from at least a portion of the one or more users.

15. The method of claim 12, wherein each of the one or more purchase experience recommendation data sets comprises a machine learning model of the one or more machine learning models.

16. The method of claim 12, wherein each of the one or more purchase experience recommendation data sets comprises one or more recommendations based on one or more of product data and support data collected from at least a portion of the one or more users.

17. The method of claim 12, wherein applying a federated ensemble-based machine learning algorithm further comprises:
  aggregating the at least one of the one or more purchase experience recommendation data sets and the at least one of the one or more product experience recommendation data sets to form the personalized model to distill knowledge from both the at least one of the one or more purchase experience recommendation data sets and the at least one of the one or more product experience recommendation data sets into the personalized model.

18. The method of claim 17, wherein forming the personalized model further comprises:
  predicting recommendation data for one or more unavailable product experience recommendation data sets; and
  aggregating the predicted recommendation data with one or more available product experience recommendation data sets.

19. A computer program product comprising a non-transitory processor-readable storage medium having stored therein program code of one or more software programs, wherein the program code, when executed by at least one processing device, causes the at least one processing device to:
  identify, using one or more machine learning models, one or more similarities between product experience data of a given user and product experience data of one or more users to generate one or more product experience recommendations for the given user;
  identify, using the one or more machine learning models, one or more similarities between purchase experience data of the given user and purchase experience data of the one or more users to generate one or more purchase experience recommendations for the given user;
  generate a first machine learning model comprising at least one or more product experience recommendation data sets respectively from one or more product entities, wherein each of the one or more product experience recommendation data sets corresponds to one or more products produced by a respective one of the one or more product entities and is based on the one or more product experience recommendations for the given user with respect to at least one of the one or more products;

generate a second machine learning model comprising at least one or more purchase experience recommendation data sets respectively from one or more commerce entities, wherein each of the one or more purchase experience recommendation data sets corresponds to the one or more products sold by a respective one of the one or more commerce entities and is based on the one or more purchase experience recommendations for the given user with respect to at least one of the one or more products;

apply a federated ensemble-based machine learning algorithm to a ground truth label, at least one of the one or more purchase experience recommendation data sets and at least one of the one or more product experience recommendation data sets to generate and train a personalized model, wherein the application of the federated ensemble-based machine learning algorithm comprises:

aggregating the first machine learning model and the second machine learning model into the personalized model by combining each of the one or more product experience recommendation data sets with each of the one or more purchase experience recommendation data sets; and determining one or more adaptations to be implemented on a purchasing interface of at least one of the one or more commerce entities with respect to a given one of the one or more users based on the personalized model to recommend one or more products to the given one of the one or more users; and cause the one or more adaptations to be maintained wherein the given one of the one or more users is enabled to switch from the purchasing interface of at least one of the one or more commercial entities to another purchasing interface of at least another of the one or more commercial entities.

20. The computer program product of claim 19, wherein applying a federated ensemble-based machine learning algorithm further comprises:

aggregating the at least one of the one or more purchase experience recommendation data sets and the at least one of the one or more product experience recommendation data sets to form the personalized model to distill knowledge from both the at least one of the one or more purchase experience recommendation data sets and the at least one of the one or more product experience recommendation data sets into the personalized model.

* * * * *